United States Patent
Anand et al.

(10) Patent No.: US 8,024,728 B2
(45) Date of Patent: Sep. 20, 2011

(54) VIRTUAL MACHINE DISPATCHING TO MAINTAIN MEMORY AFFINITY

(75) Inventors: Vaijayanthimala K. Anand, Austin, TX (US); Peter Joseph Heyrman, Rochester, MN (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1300 days.

(21) Appl. No.: 11/617,206

(22) Filed: Dec. 28, 2006

(65) Prior Publication Data

US 2008/0163203 A1 Jul. 3, 2008

(51) Int. Cl.
*G06F 9/455* (2006.01)
(52) U.S. Cl. .......................................................... 718/1
(58) Field of Classification Search .................. 718/1
See application file for complete search history.

(56) References Cited

U.S. PATENT DOCUMENTS

| | | | |
|---|---|---|---|
| 5,193,202 A * | 3/1993 | Jackson et al. ................ | 718/100 |
| 6,260,068 B1 * | 7/2001 | Zalewski et al. .............. | 709/226 |
| 6,339,818 B1 | 1/2002 | Olszewski et al. | |
| 6,957,435 B2 * | 10/2005 | Armstrong et al. ........... | 718/104 |
| 2002/0156824 A1 * | 10/2002 | Armstrong et al. ........... | 709/104 |
| 2002/0184290 A1 | 12/2002 | Olszewski et al. | |
| 2004/0143833 A1 | 7/2004 | Heyrman et al. | |
| 2005/0198635 A1 | 9/2005 | Olszewski et al. | |
| 2006/0048160 A1 | 3/2006 | Olszewski et al. | |
| 2006/0130062 A1 | 6/2006 | Burdick et al. | |
| 2006/0206891 A1 | 9/2006 | Armstrong et al. | |

OTHER PUBLICATIONS

U.S. Appl. No. 11/419,019, filed May 18, 2006, Olszewski et al.
U.S. Appl. No. 11/419,047, filed May 18, 2006, Olszewski et al.

* cited by examiner

*Primary Examiner* — Jennifer N. To
*Assistant Examiner* — Mengyao Zhe
(74) *Attorney, Agent, or Firm* — Yee & Associates, P.C.; Justin M. Dillon (57) ABSTRACT

A computer implemented method, data processing system, and computer usable program code are provided for dispatching virtual processors. A determination is made as to whether a physical processor in a set of physical processors is idle, and, if so, a determination is made as to whether an affinity map for the idle physical processor exists. Responsive to an existence of the affinity map, a determination is made as to whether a virtual processor last mapped to the idle physical processor is ready to run using the affinity map and a dispatch algorithm. Responsive to identifying a ready-to-run virtual processor whose affinity map indicates that the idle physical processor is mapped to this virtual processor in its preceding dispatch, the ready-to-run virtual processor is dispatched to the idle physical processor. Thus, memory affinity is maintained between physical and virtual processors when the memory affinity is not expired.

20 Claims, 8 Drawing Sheets

VIRTUAL MACHINE DISPATCHING TO MAINTAIN MEMORY AFFINITY

BACKGROUND OF THE INVENTION

1. Field of the Invention

The present invention relates generally to maintaining memory affinity. More specifically, the present invention relates to a computer implemented method, data processing system, and computer usable program code for maintaining memory affinity between physical and virtual processors using virtual machine dispatching.

2. Description of the Related Art

Virtualization of computing resources is important in current computer environments. International Business Machine's POWER™ hypervisor, which is part of the firmware in Power 5™ systems, allows the virtualization of physical processors. Hypervisor is a partition management code in the firmware. Virtualization of physical processors is implemented by time-slicing physical processors across the virtual processors. In such an environment, fractional processor allocations enable a greater number of partitions than the number of available physical processors in the system. In addition, each of these partitions may have an arbitrary number of virtual processor systems. This configuration allows an opportunity for any partition to use all the available processors at any time if entitlement is defined as uncapped. Partition entitlement is the amount of time a processor is guaranteed within a dispatch wheel time (time slice). Within the partition, virtual processors run to limits of partitioned entitlement before virtual processors are time-sliced. The "uncapped partition entitlement" allows the partition to use more resources than what the entitlement limit is set. The partition entitlement is evenly distributed amongst the online virtual processors so that the number of online virtual processors impacts the length of each virtual processor's dispatch cycle.

The hypervisor uses the architectural metaphor of a dispatch wheel with a fixed rotation period of a fixed number of milliseconds to guarantee that each virtual processor receives its share of entitlement in a timely fashion. The hypervisor uses a simple scheduling model, where the processor entitlement is distributed with each turn of the hypervisor's dispatch wheel, so each partition is guaranteed a relatively constant stream of service. Entitlement has to be consumed by each partition in a single rotation of the wheel or it is lost. Capacity may be consumed unevenly by the virtual processors in a partition if some of them cede or confer their cycles.

The dispatching and undispatching of virtual processors onto physical processors frequently moves a partition's operating system along with the workloads that are running in it around the system. If the working set memory size is large, then the processor caches are repopulated every time the workload is moved between these processors. If the dispatching frequently changes the mapping of physical to virtual processors, then the cost attributed to cache thrashing will be heavy.

To minimize the cache overhead, the hypervisor needs to maintain the physical and virtual processor affinity while dispatching them. However, the two goals of achieving maximum utilization through virtualization and maintaining physical to virtual processor affinity are in direct conflict with each other. When a processor becomes idle to maximize its utilization, the virtual processor needs to be assigned to the idle processor whether the idle processor ran virtual processor last or not. To maintain affinity, if the free virtual processor is not the last ran virtual processor, then deferring dispatching until the last ran virtual processor becomes free will end up wasting the central processing unit cycles. Finding the fine line between these conflicting requirements needs much more complex algorithm that takes into account many other factors that are part of the micro-partitioned environment.

The POWER™ hypervisor maintains four states in its central processing unit resource management or dispatching state engine. The states include wait, frozen, free, and run. When a physical processor is undispatched from a virtual processor, the virtual processor goes into wait state. If the virtual processor has used its entitlement, the virtual processor goes into frozen state until the next dispatch wheel time starts. The virtual processor moves from the wait state to the free state once the wait time is over. The POWER™ hypervisor selects the virtual processor to dispatch from the free virtual processor pool. When a physical processor becomes free, the hypervisor assigns it to a virtual processor from the free pool. In this selection process, the hypervisor tries to maintain processor affinity, that is, it checks to see if the physical processor is mapped to a specific virtual processor of a specific partition in the preceding time. However, it is not always possible to find the one processor that was mapped in the preceding time as the number of physical processors are fewer than the number of virtual processors, and idle cycles of a virtual processor are ceded to other virtual processors. Thus, a need exists to improve the chances of processor affinity.

SUMMARY OF THE INVENTION

The illustrative embodiments provide a computer implemented method, data processing system, and computer usable program code for dispatching virtual processors. The illustrative embodiments determine if a physical processor in a set of physical processors is idle forming a first idle physical processor. The illustrative embodiments determine if an affinity map for the first idle physical processor exists in response to an existence of the first idle physical processor. The affinity map provides a first mapping of the first idle physical processor to a set of virtual processors that ran last on the first idle physical processor over a number of events. The affinity map provides a second mapping of a set of partition identifiers to the set of virtual processors that ran last on the first idle physical processor over the number of events.

The illustrative embodiments determine whether a virtual processor in the set of virtual processors last mapped to the physical processor is ready to run using the affinity map for the first idle physical processor and a dispatch algorithm in response to an existence of the affinity map for the first idle physical processor. The illustrative embodiments dispatch the ready-to-run virtual processor to the first idle physical processor in response to identifying a ready-to-run virtual processor whose affinity map indicates that the first idle physical processor is mapped to this virtual processor in its preceding dispatch. Thus, memory affinity is maintained between physical and virtual processors when the memory affinity is not expired.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
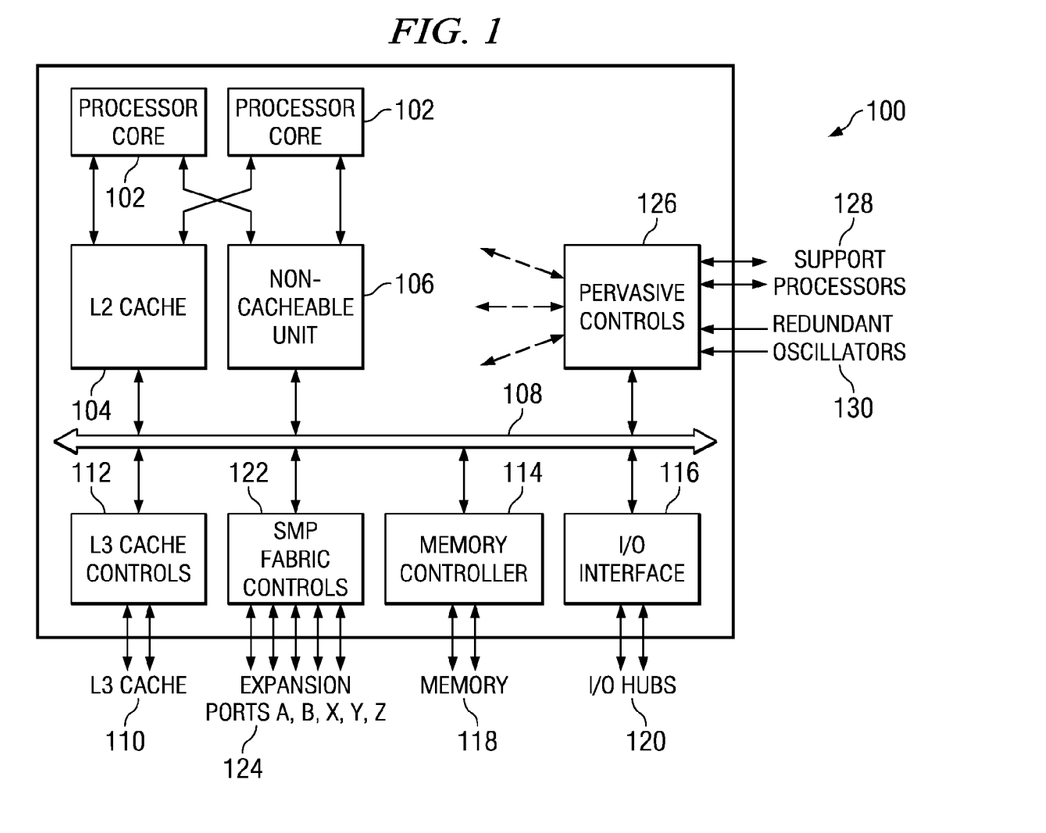
FIG. 1 is a representative processor chip in accordance with an illustrative embodiment.

The illustrative embodiments provide for maintaining memory affinity between physical and virtual processors using virtual machine dispatching. FIG. 1 is a representative core processor chip in accordance with an illustrative embodiment. Core processor chip 100 may have one or more processor cores 102. Each processor core may simply be referred to as a core. A processor core may have multithreading capability, error detection and recovery functions, numerous general purpose registers (GPR), and special purpose registers (SPR).

In accordance with an illustrative embodiment, processor core 102 may be connected to level 2 (L2) cache 104 and non-cacheable unit (NCU) 106. Non-cacheable unit 106 may handle store commands by placing command, address, and data received from processor core 102 onto fabric bus 108 for storage to main memory. Such stores may alternatively be to memory-mapped I/O or registers. Non-cacheable unit 106 may handle load commands by placing command and address received from processor core 102 onto fabric bus 108 for access to memory or memory mapped I/O or registers and receives returned data from fabric bus 108. Access to memory that may be susceptible to frequent accesses later may be stored to level 2 cache 104 in order to reduce latency of future operations performed by processor core 102.

Level 2 cache 104 may similarly provide access to its contents via fabric bus 108 which may interconnect to other chips on the same board and also beyond the board upon which core processor chip 100 is placed. A nearby but off-chip level 3 (L3) cache 110 may be provided. Controls governing access between processor core 102 and level 3 cache 110 are in level 3 cache controls 112. Similarly, memory controller 114 and I/O interface 116 may be provided on-chip to facilitate long-latency access to memory 118 and to various I/O hubs 120, respectively.

Symmetric multi-processor (SMP) fabric controls 122 is a special purpose device that mediates the contention for fabric bus 108 by the various attached devices and provides for symmetric multi-processor topology configuration via expansion ports A, B, X, Y and Z 124. Five expansion ports are shown in the embodiment; however, it is understood that to achieve varying levels of complex multi-chip topologies, fewer or more expansion ports may be used. It is anticipated that five ports may provide 64 chips with rapid instruction, data and timing signals among them.

Pervasive controls 126 are circuits that exist both outside and mingled within the various processing blocks found on chip. Among the functions of pervasive controls 126 are providing of back-ups to the processor state on each processor core 102 by providing redundant copies of various general purpose registers and special purpose registers of each processor core 102 at convenient instruction boundaries of each processor core 102. In addition, pervasive controls 126 may assist in the detection of errors and communication of such errors to outside support processors (service processor) 128 for further action by, e.g. out-of-band firmware. It should be noted that the terms "support processor" and "service processor" may be used interchangeably.

Pervasive controls 126 are a gating point for redundant oscillators 130 and provide or receive derivative timing signals. It is appreciated that a fault or other condition may remove one or more redundant oscillators 130 from the configuration, and it is an object of pervasive controls 126 to select the better timing signal (or at least one that is within tolerances) from among redundant oscillators 130 and step-encoded signals that may arrive via expansion ports A, B, X, Y and Z 124.

Pervasive controls 126 may also contain control state machines for starting and stopping clocks, scanning of Level Sensitive Scan Design (LSSD) latches, and serial communication paths (SCOM) to register facilities, in response to stimulus from support processors 128.

Figure 2:
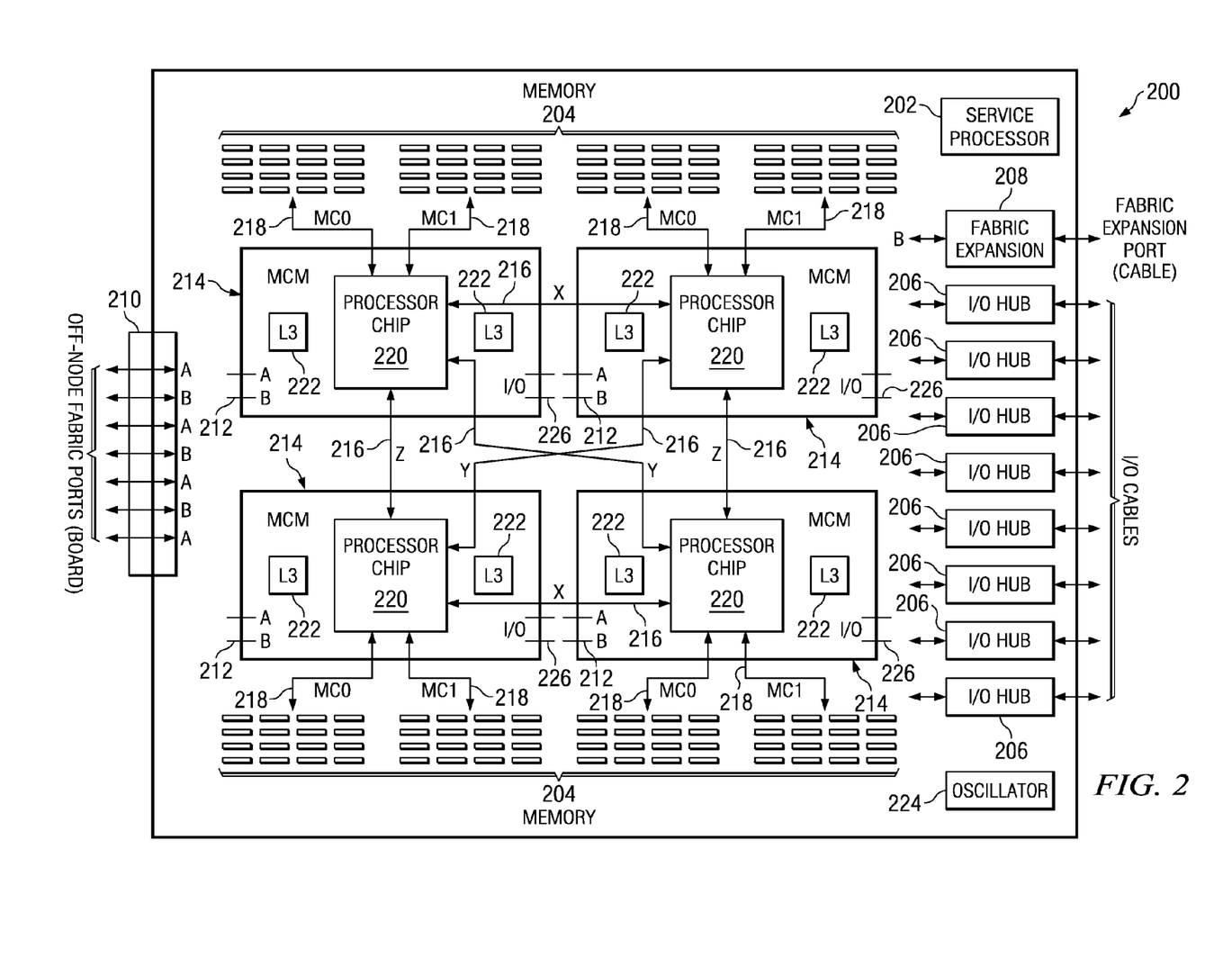
FIG. 2 is an exemplary configuration of a symmetric multiprocessor node in accordance with an illustrative embodiment.

FIG. 2 depicts an exemplary configuration of a symmetric multiprocessor using core processor chip 100 of FIG. 1 in the form of processor node 200 in accordance with an illustrative embodiment. Processor node 200 may contain one or more of service processor 202, memory banks 204, I/O hubs 206, fabric expansion port 208, and off-node fabric expansion ports 210. Fabric expansion port 208 and off-node fabric expansion ports 210 provide connectivity for A and B ports 212 from each of multi-chip modules (MCM) 214 to multi-chip modules on other processor nodes. Fabric ports X, Y, and Z 216 interconnect multi-chip modules 214 within processor node 200. Fabric ports X, Y, Z, A, and B relate to fabric bus 108, SMP fabric controls 122, and expansion ports A, B, X, Y and Z 124 from FIG. 1.

Additionally, memory banks 204 are connected to multi-chip modules 214 through connections 218 which relate to the connection between memory controller 114 and memory 118 of FIG. 1. Each of multi-chip modules 214 may be identical in its hardware configuration but configured by firmware during system initialization to support varying system topologies and functions as, e.g. enablement of master and slave functions or connectivity between various combinations of multiple nodes in a scaleable multi-node symmetric multi-processor system.

Within a particular multi-chip module there may be found core processor chip 220 which relates to core processor chip 100 of FIG. 1, as well as level 3 cache 222 which relates to level 3 cache 110 of FIG. 1. Processor node 200 may have one or more oscillators 224 routed to each chip found on processor node 200. Connections between oscillators 224 and functional units extend throughout the board and chips but are not shown in FIG. 2 in order to limit clutter. Similarly, it is understood that many convoluted interconnects exist between fabric expansion port 208, off-node fabric expansion ports 210, and I/O hubs 206 to the various chips on the board, such as A and B ports 212 and I/O ports 226 of multi-chip module 214, among other components, though such interconnects are not shown in FIG. 2.

Figure 3:
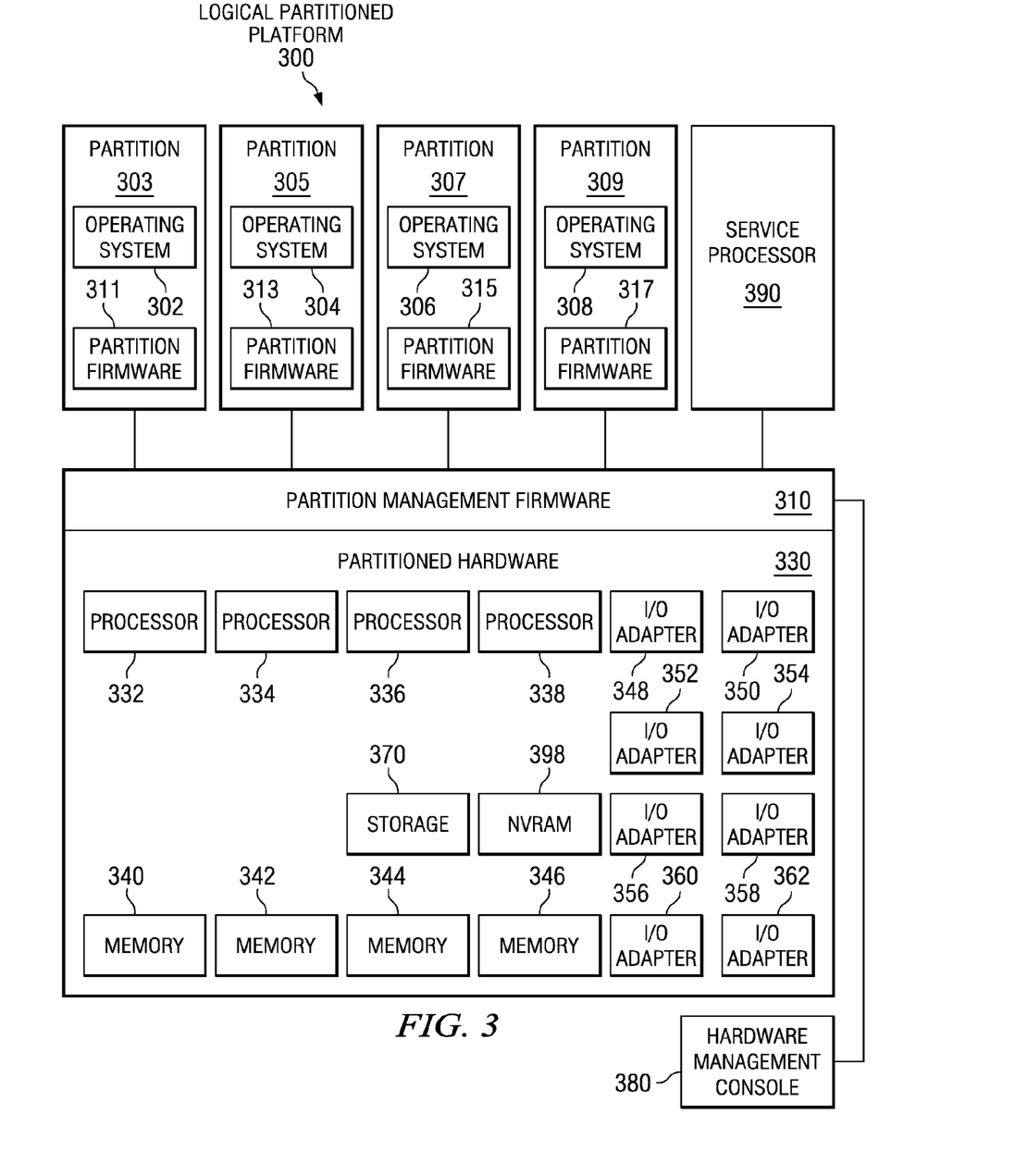
FIG. 3 is a block diagram of an exemplary logical partitioned platform in which the illustrative embodiments may be implemented.

With reference now to FIG. 3, a block diagram of an exemplary logical partitioned platform is depicted in which the illustrative embodiments may be implemented. Logical partitioned platform 300 includes partitioned hardware 330, operating systems 302, 304, 306, 308, and partition management firmware 310. Operating systems 302, 304, 306, and 308 may be multiple copies of a single operating system or multiple heterogeneous operating systems simultaneously run on logical partitioned platform 300. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX® and Linux®, may be used depending on the particular implementation. Operating systems 302, 304, 306, and 308 are located in partitions 303, 305, 307, and 309. Hypervisor software is an example of software that may be used to implement partition management firmware 310 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 311, 313, 315, and 317. Partition firmware 311, 313, 315, and 317 may be implemented using initial boot strap code, IEEE-1275 Standard Open Firmware, and runtime abstraction software (RTAS), which is available from International Business Machines Corporation. When partitions 303, 305, 307, and 309 are instantiated, a copy of boot strap code is loaded onto partitions 303, 305, 307, and 309 by partition management firmware 310. Thereafter, control is transferred to the boot strap code with the boot strap code then loading the open firmware and RTAS. The processors associated or assigned to the partitions are then dispatched to the partition's memory to execute the partition firmware.

Partitioned hardware 330 includes a plurality of processors 332-338, a plurality of system memory units 340-346, a plurality of input/output (I/O) adapters 348-362, and storage unit 370. Processors 332-338 may be processors, such as core processor chip 100 of FIG. 1. Each of processors 332-338, memory units 340-346, NVRAM storage 398, and I/O adapters 348-362 may be assigned to one of multiple partitions within logical partitioned platform 300, each of which corresponds to one of operating systems 302, 304, 306, and 308.

Partition management firmware 310 performs a number of functions and services for partitions 303, 305, 307, and 309 to create and enforce the partitioning of logical partitioned platform 300. Partition management firmware 310 is a firmware implemented virtual machine identical to the underlying hardware. Thus, partition management firmware 310 allows the simultaneous execution of independent operating systems 302, 304, 306, and 308 by virtualizing all the hardware resources of logical partitioned platform 300.

Service processor 390 may be used to provide various services, such as processing of platform errors in the partitions. These services also may act as a service agent to report errors back to a vendor, such as International Business Machines Corporation. Operations of the different partitions may be controlled through a hardware management console, such as hardware management console 380. Hardware management console 380 is a separate data processing system from which a system administrator may perform various functions including reallocation of resources to different partitions.

The illustrative embodiments use a virtual machine, thus, a processor may be shared between partitions. IBM® Advanced Power Virtualization enables fractional processor allocations to partitions. For example, if there are two processors in the system, and the system is to be partitioned into five partitions using Shared Processor LPAR (SPLPAR) technology, the following configuration is one possibility:

Each partition gets 0.4 processors as its entitlement. Since there are two processors in the system, at any one time one partition may use both processors concurrently if the rest of partitions are idle. So two virtual central processing units (CPUs) may be configured for each partition.

There is also an option called capped mode and uncapped mode. Using uncapped mode, a partition may use more than its entitlement, say four or the five partitions are idling most of the time, the active partition could use up to two processors even though its entitlement is set to 0.4 processors.

In capped mode the partition is not allowed to use more than its entitlement.

That is why the number of virtual processors configured for each partition increases the number of possible combinations of physical and virtual processor affinity.

The illustrative embodiments provide for maintaining memory affinity between physical and virtual processors using virtual machine dispatching. A first level of improved memory affinity is provided by maintaining affinity of a physical processor to a virtual processor. A second level of improved memory affinity is provided by maintaining affinity of a physical processor to a logical partition. That is, if a free virtual processor is not available that has affinity to a physical processor, an attempt is then made to find any free virtual processor of a logical partition where the specified physical processor ran last. By performing the second level of assignment, there is a high probability that the working set in the cache of the processor will still be warm, avoiding the need to repopulate the cache completely.

On certain hardware systems, cache lines are tagged to logical partitions. On other architectures, cache line tagging to logical partitions may be incomplete. On architectures where the cache lines are tagged to logical partitions, translations are invalidated when context is switched from one logical partition to another logical partition to provide security. Thus, every time the partition management firmware dispatches to another logical partition, it must invalidate translations. Dispatching to another logical partition has two impacts. The first impact is the time consumed by a processor cycling to invalidate translations on each context switch to another logical partition. The second impact is the time consumed to repopulate the translations to a translation lookaside buffer (TLB). A translation lookaside buffer is a memory buffer that is used to improve the performance of virtual memory systems. The illustrative embodiments provide for a reduction in the number of partition-to-partition context switches by dispatching the same physical processors back to the same logical partition where they were dispatched previously.

Figure 4:
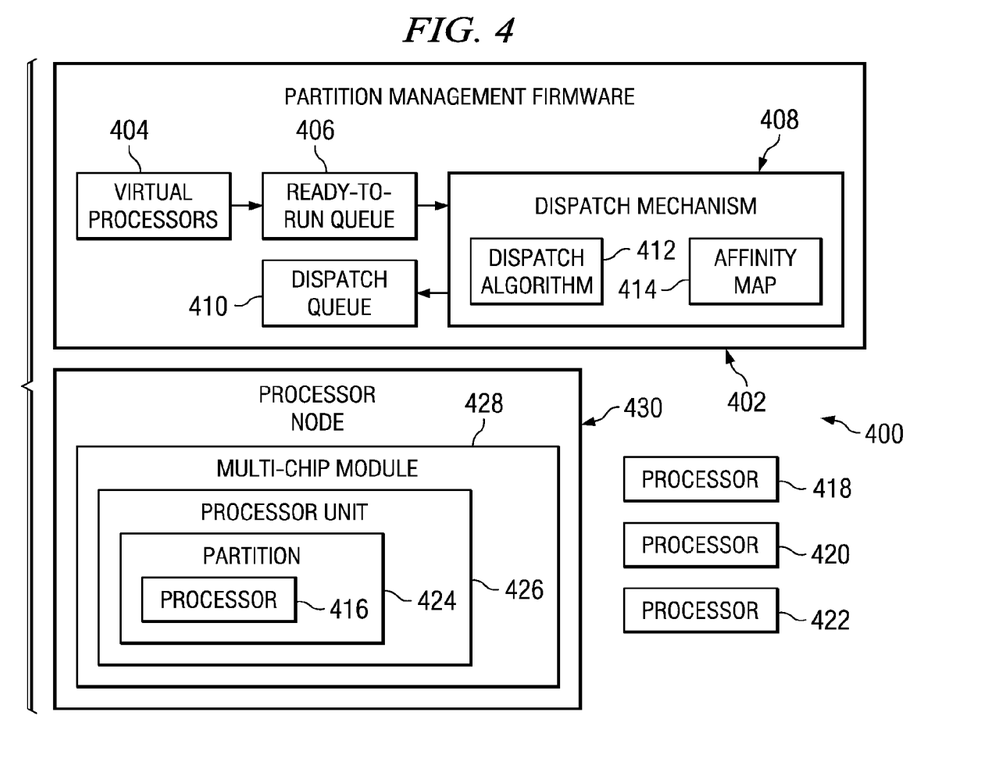
FIG. 4 is a functional block diagram of a virtual machine dispatching system where a physical processor becomes idle in accordance with an illustrative embodiment.

FIG. 4 is a functional block diagram of a virtual machine dispatching system where a physical processor becomes idle in accordance with an illustrative embodiment. Virtual machine dispatching system 400 is implemented in partition management firmware 402 that is a partition management firmware, such as partition management firmware 310 of FIG. 3. Partition management firmware 402 includes virtual processors 404 that are virtualized by partition management firmware 402, ready-to-run queue 406, dispatch mechanism 408, and dispatch queue 410. Virtual processors 404 may be a set of virtual processors that includes one or more virtual processors.

In this illustrative embodiment, instead of virtual processors 404 being placed on dispatch queue 410, when each one of virtual processors 404 becomes ready to run, a ready-to-run one of virtual processors 404 is placed on ready-to-run queue 406. Dispatch algorithm 412 in dispatch mechanism 408 uses affinity map 414 to perform a push process. Affinity map 414 in dispatch mechanism 408 maintains a mapping of virtual processors 404 to physical processors 416, 418, 420, and 422 over a number of events. In the illustrative examples, these events may be for a period of time or a number of iterations. The number of events may be one or more events. For example, if the number of events is a single event, the event may be the period of time. Affinity map 414 also maintains a correlation of physical processors 416, 418, 420, and 422 to virtual processors 404 with their corresponding partition identification. In addition, physical processors 416, 418, 420, and 422 will maintain their home node information. For example, physical processor 416 to:

partition 424 on which physical processor 416 last ran on;
virtual processor number within partition 424 where physical processor 416 last ran;
processor unit 426 in which physical processor 416 resides;
multi-chip module 428 in which physical processor 416 resides; and
processor node 430 in which physical processor 416 resides.

Dispatch mechanism 408 un-dispatches one of physical processors 416, 418, 420, and 422 from one of virtual processors 404 of a partition. As a result, a physical processor becomes idle. Then, dispatch mechanism 408 initiates dispatch algorithm 412 that uses affinity map 414 in order to find a virtual processor from ready-to-run queue 406 to assign to physical processor 416. As an exemplary operation, dispatch algorithm 412 performs the following push process when physical processor 416 becomes idle:

1. Find a ready-to-run virtual processor on dispatch queue 410 that was previously mapped or dispatched to idle physical processor 416 in a preceding dispatch;
2. If physical processor 416 cannot be mapped in step 1, see if additional physical processors 418, 420, and 422 became free in the meantime, and repeat step 1;
3. If the physical processor cannot be mapped in steps 1 or 2, find a ready-to-run virtual processor on dispatch queue 410 that ran on partition 424 where idle physical processor 416 ran in a preceding dispatch;
4. If physical processor 416 cannot be mapped in step 3, see if additional physical processors 418, 420, and 422 became free in the meantime, and repeat step 3;
5. If the physical processor cannot be mapped in steps 3 or 4, find a ready-to-run virtual processor on dispatch queue 410 that ran on a processor core in processor unit 426 where idle physical processor 416 is another processor core in the same processor unit;
6. If physical processor 416 cannot be mapped in step 5, see if additional physical processors 418, 420, and 422 became free in the meantime, and repeat step 5;
7. If the physical processor cannot be mapped in steps 5 or 6, find a ready-to-run virtual processor on dispatch queue 410 that ran on multi-chip module 428 where current idle physical processor 416 last ran;
8. If physical processor 416 cannot be mapped in step 7, see if additional physical processors 418, 420, and 422 became free in the meantime, and repeat step 7;
9. If the physical processor cannot be mapped in steps 7 or 8, dispatch the first virtual processor in dispatch queue 410 to physical processor 416 idle.

In the push process performed by dispatch algorithm 412, dispatch algorithm 412 performs the following sub-algorithm if affinity map 414 still contains a mapping of the ready-to-run virtual processor and affinity has not expired. That is, the target physical processor where the ready-to-run virtual processor last ran has not been dispatched to other partitions and its cache still has valid data. Also, at the same time the virtual processor of the associated partition has not been dispatched to other physical processors between its last dispatch to the target physical processor and present dispatch. Even though the physical processor has data relevant to the ready-to-run virtual processor, data may not be current or of no value.

1. Push ready-to-run virtual processor to the last physical processor used, for example, physical processor 416, if physical processor 416 is idle;
2. Wait for a predetermined time to see if another physical processor becomes idle and repeat step 1;
3. If the virtual processor cannot be mapped in steps 1 or 2, push to processor unit 426 if another physical processor in processor unit 426 is free;
4. Wait for a predetermined time to see if another physical processor becomes idle and repeat step 3;
5. If the virtual processor cannot be mapped in steps 3 or 4, push to multi-chip module 428 if another physical processor on another processing unit in multi-chip module 428 is idle;
6. Wait for a predetermined time to see if another physical processor becomes idle and repeat step 5;
7. If the virtual processor cannot be mapped in steps 5 or 6, push to a home multi-chip module in processor node 430 if another physical processor on the home multi-chip module in processor node 430 is idle. A home multi-chip module in processor node 430 is determined based on which multi-chip module has the most cache and memory allocated in processor node 430;
8. Wait for a predetermined time to see if another physical processor becomes idle and repeat step 7;
9. If the virtual processor cannot be mapped in steps 7 or 8, push to any one of physical processors 418, 420, or 422 that is idle;
10. If the virtual processor cannot be mapped in step 9, dispatch mechanism 408 places the virtual processor on dispatch queue 410.

In the push process performed by dispatch algorithm 412, dispatch algorithm 412 performs the following sub-algorithm if affinity map 414 does not contain a mapping of the ready-to-run virtual processor, or affinity has expired for example:

1. Push the virtual processor to physical processor in the same chip if available;
2. Push the virtual processor to home multi-chip module. In this example, the home multi-chip module would be the multi-chip module that has the most cache and memory allocated in any processor node;
3. If the virtual processor cannot be mapped in step 1, push the virtual processor to any idle processor; and
4. If the virtual processor cannot be mapped in step 2, dispatch mechanism 408 places the virtual processor on dispatch queue 410.

Figure 5A:
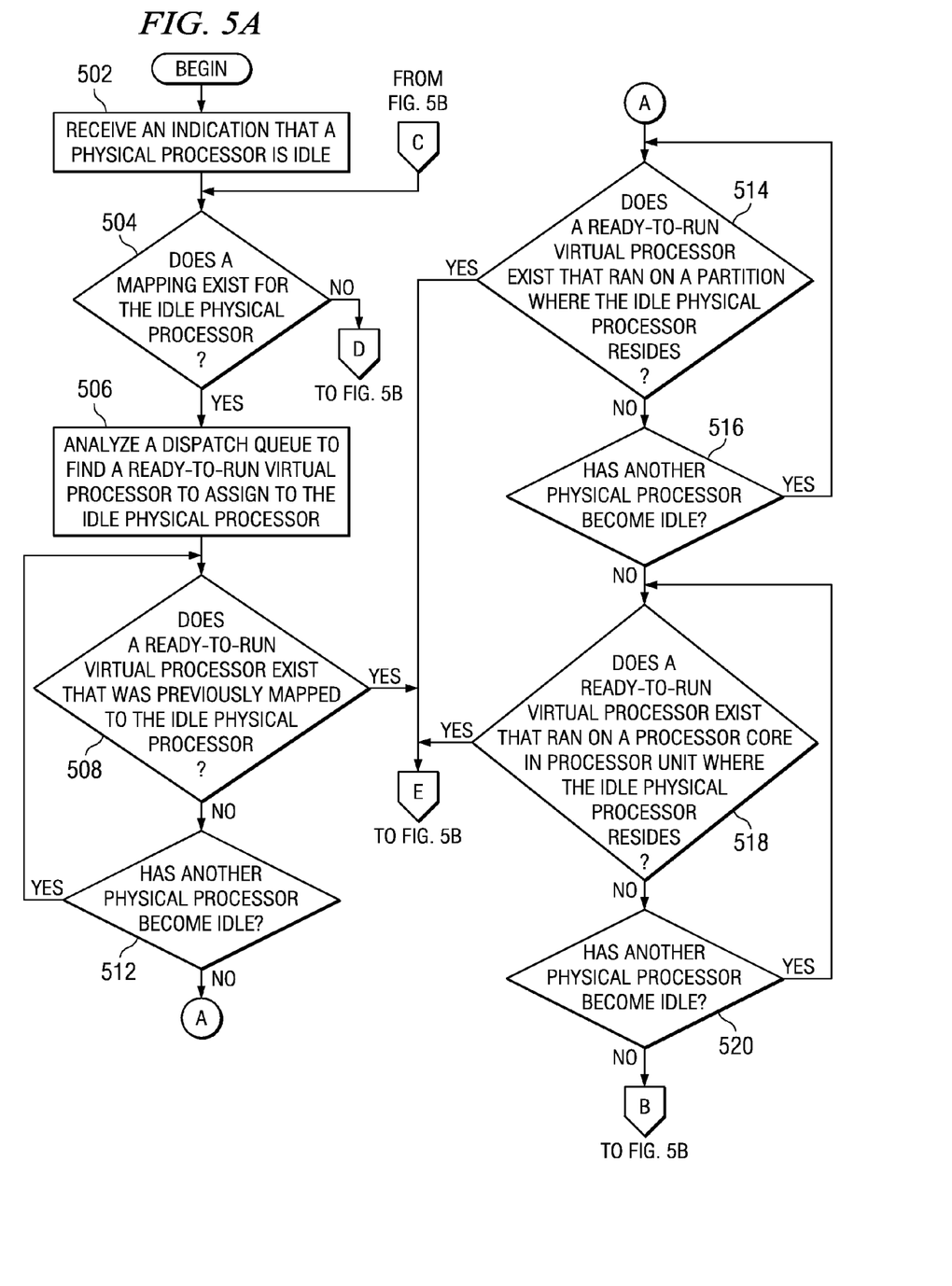
FIGS. 5A and 5B depict a flowchart of the operation performed by a virtual machine dispatching system where a physical processor becomes idle in accordance with an illustrative embodiment.
Figure 5B:
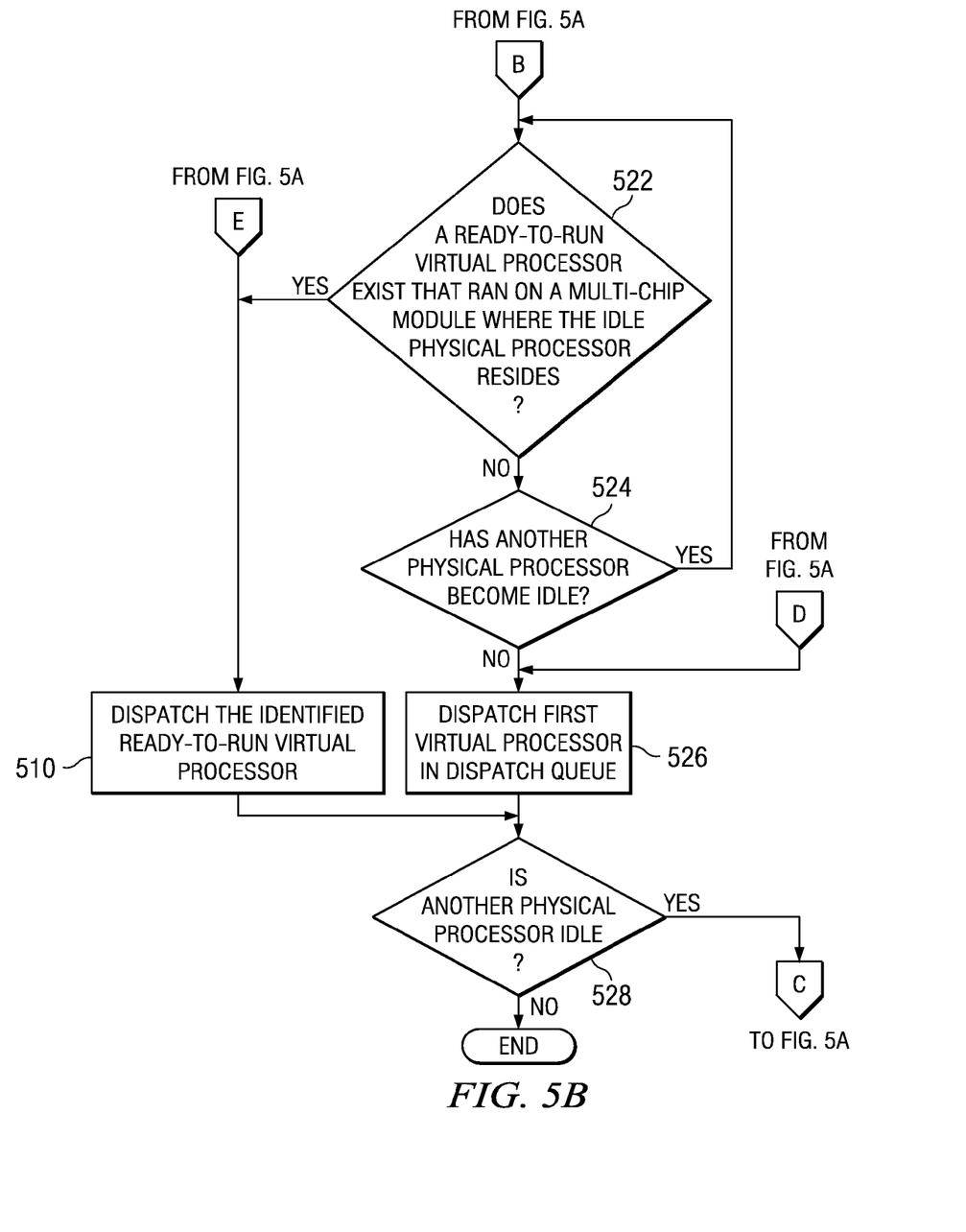

FIGS. 5A and 5B depict a flowchart of the operation performed by a virtual machine dispatching system, such as virtual machine dispatching system 500 of FIG. 5, where a physical processor becomes idle in accordance with an illustrative embodiment. As the operation begins, a dispatching mechanism, such as dispatch mechanism 408 of FIG. 4, receives an indication from a physical processor that the physical processor is idle (step 502). The dispatching mechanism checks an affinity map for that physical processor to determine if a previous virtual processor to the idle physical processor mapping exists (step 504). If an affinity map for the idle physical processor exists, then the dispatch mechanism uses a dispatch algorithm to analyze the virtual processors that are in a dispatch queue (step 506). The dispatch mechanism using the dispatch algorithm determines if there is a ready-to-run virtual processor on the dispatch queue that was previously mapped or dispatched to the idle physical processor in a preceding dispatch (step 508).

If at step 508 there is a ready-to-run virtual processor, then the dispatch mechanism, using a sub-algorithm to determine the value of the affinity presented in the map, dispatches the ready-to-run virtual processor to the idle physical processor (step 510). The sub-algorithm is described in FIGS. 6A and 6B. If at step 508 there is not a free virtual processor, then the dispatch mechanism determines if another physical processor has become idle (step 512). If at step 512 another physical processor has become idle, then the operation returns to step 508. If at step 512, another physical processor has not become idle, then the dispatch mechanism using the dispatch algorithm determines if there is a ready-to-run virtual processor on the dispatch queue that ran on a partition where the idle physical processor ran in a preceding dispatch (step 514). If at step 514 there is a ready-to-run virtual processor, then the dispatch mechanism, using the sub-algorithm to determine the value of the affinity presented in the map, dispatches the ready-to-run virtual processor to the idle physical processor (step 510). If at step 514 there is not a ready-to-run virtual processor, then the dispatch mechanism determines if another physical processor has become idle (step 516). If at step 516 another physical processor has become idle, then the operation returns to step 514. If at step 516, another physical processor has not become idle, then the dispatch mechanism using the dispatch algorithm determines if there is a ready-to-run virtual processor on the dispatch queue that ran on a processor core in a processor unit where the idle physical processor is another processor core in the same processor unit (step 518).

If at step 518 there is a ready-to-run virtual processor, then the dispatch mechanism, using the sub-algorithm to determine the value of the affinity, dispatches the ready-to-run virtual processor to the idle physical processor (step 510). If at step 518 there is not a ready-to-run virtual processor, then the dispatch mechanism determines if another physical processor has become idle (step 520). If at step 520 another physical processor has become idle, then the operation returns to step 518. If at step 520, another physical processor has not become idle, then the dispatch mechanism using the dispatch algorithm determines if there is a ready-to-run virtual processor on the dispatch queue that ran on a multi-chip module where the idle physical processor last ran (step 522). If at step 522 there is a ready-to-run virtual processor, then the dispatch mechanism, using the sub-algorithm to determine the value of affinity, dispatches the ready-to-run virtual processor to the idle physical processor (step 510). If at step 522 there is not a ready-to-run virtual processor, then the dispatch mechanism determines if another physical processor has become idle (step 524). If at step 524 another physical processor has become idle, then the operation returns to step 522. If at step 524, another physical processor has not become idle, then the dispatch mechanism dispatches the first ready-to-run virtual processor in the dispatch queue to the idle physical processor (step 526).

Returning to step 504, if an affinity mapping for the idle physical processor does not exist, then the dispatch mechanism dispatches the first virtual processor in the dispatch queue to the idle physical processor (step 526). From steps 510 or 526, the dispatch mechanism determines if another physical processor has become idle (step 528). If at step 528 another physical processor has become idle, then the operation returns to step 504. If at step 528 another physical processor has not become idle, then the operation terminates.

Figure 6A:
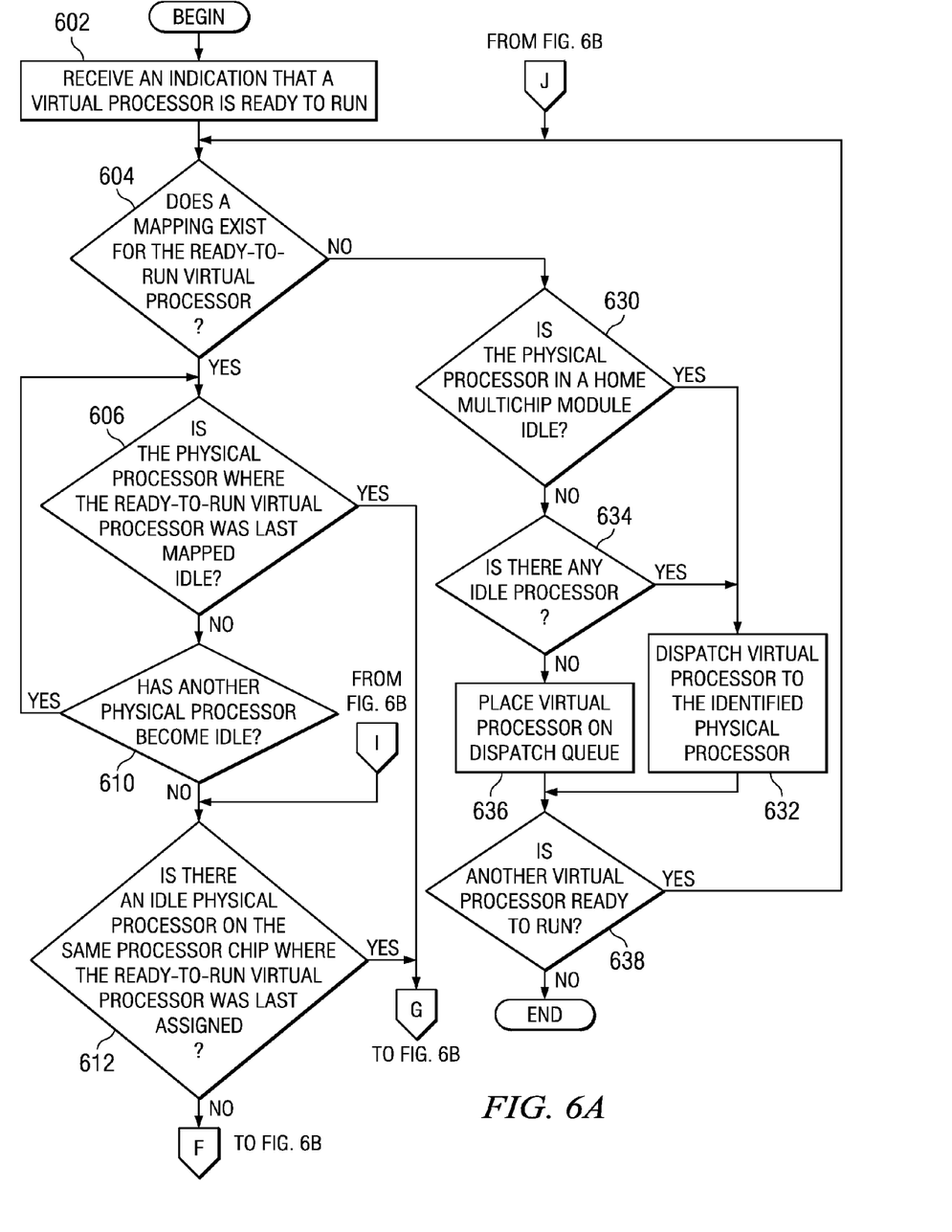
FIGS. 6A and 6B depict a flowchart of the operation performed by a virtual machine dispatching system where a virtual processor becomes ready to run and an affinity map still contains a mapping of the ready-to-run virtual processor in accordance with an illustrative embodiment.
Figure 6B:
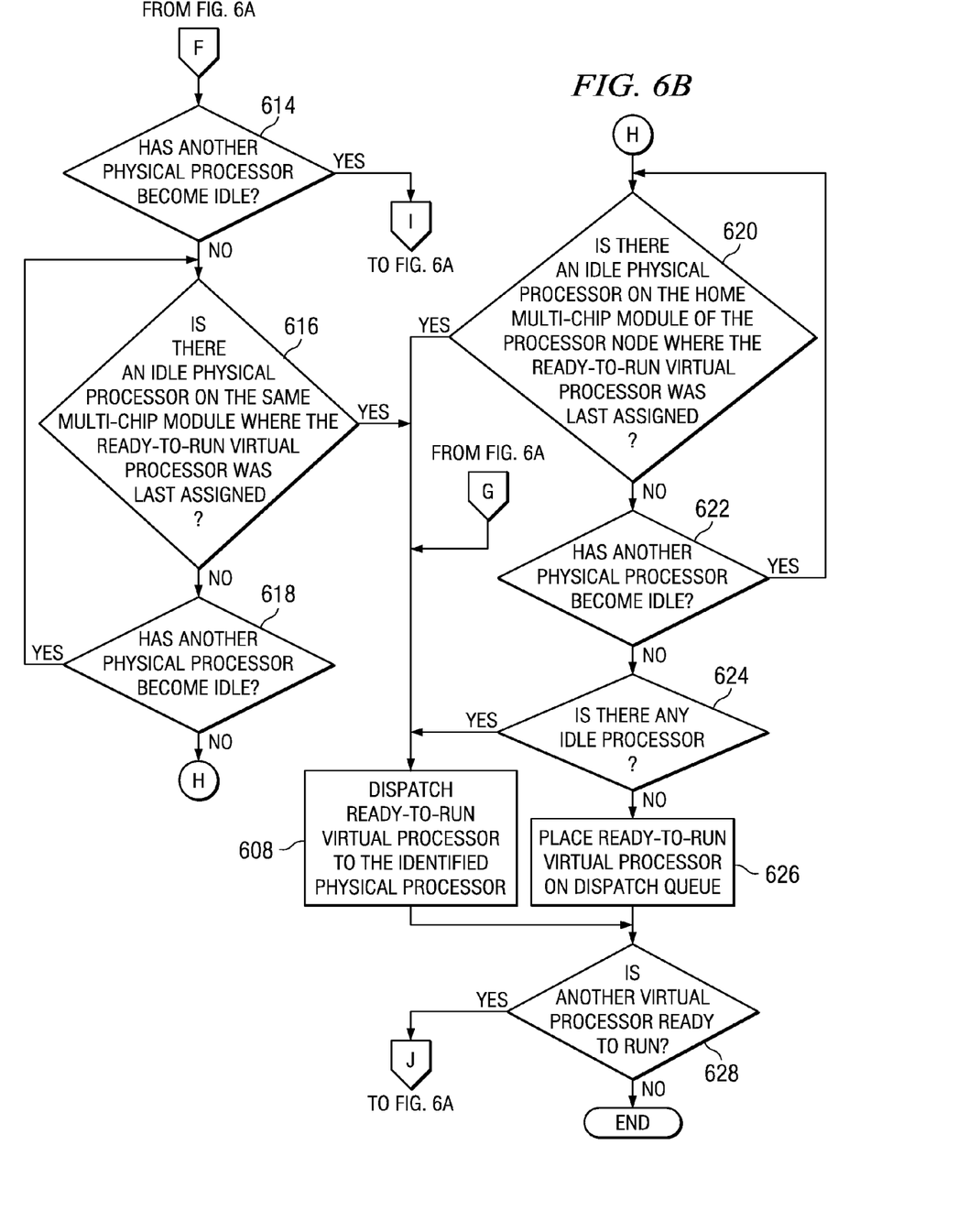

FIGS. 6A and 6B depict a flowchart of the operation performed by a virtual machine dispatching system, such as virtual machine dispatching system 408 of FIG. 4, where a virtual processor becomes ready to run and an affinity map, such as affinity map 414 of FIG. 4, still contains a mapping of the ready-to-run virtual processor in accordance with an illustrative embodiment. As the operation begins, a dispatching mechanism, such as dispatch mechanism 408 of FIG. 4, receives an indication that a virtual processor is ready to run (step 602). The dispatching mechanism checks an affinity map to determine if a previous mapping for the ready-to-run virtual processor exists indicating affinity has not expired (step 604). If an affinity map for the virtual processor exists indicating affinity has not expired, then the dispatch mechanism uses a dispatch algorithm to determine if the physical processor where the ready-to-run virtual processor last ran is idle (step 606).

If at step 606 the physical processor is idle, then the ready-to-run virtual processor is dispatched to the physical processor (step 608). If at step 606 the physical processor is not idle, then the dispatch mechanism waits a predetermined amount of time to determine if another physical processor has become idle (step 610). If at step 610 another physical processor has become idle, then the operation returns to step 606. If at step 610, another physical processor has not become idle, then the dispatch mechanism using the dispatch algorithm determines if another physical processor in the processing unit where the ready-to-run virtual processor last ran is idle (step 612). If at step 612 the physical processor is idle, then the ready-to-run virtual processor is dispatched to the physical processor (step 608). If at step 612 the physical processor is not idle, then the dispatch mechanism waits a predetermined amount of time to determine if another physical processor has become idle (step 614). If at step 614 another physical processor has become idle, then the operation returns to step 612. If at step 614, another physical processor has not become idle, then the dispatch mechanism using the dispatch algorithm determines if a physical processor in the multi-chip module where the ready-to-run virtual processor last ran is idle (step 616).

If at step 616 the physical processor is idle, then the ready-to-run virtual processor is dispatched to the physical processor (step 608). If at step 616 the physical processor is not idle, then the dispatch mechanism waits a predetermined amount of time to determine if another physical processor has become idle (step 618). If at step 618 another physical processor has become idle, then the operation returns to step 616. If at step 618, another physical processor has not become idle, then the dispatch mechanism using the dispatch algorithm determines if another physical processor in a home multi-chip module where the ready-to-run virtual processor last ran is idle (step 620). A home multi-chip module in a processor node is determined based on which multi-chip module has the most cache and memory allocated. If at step 620 the physical processor is idle, then the ready-to-run virtual processor is dispatched to the physical processor (step 608). If at step 620 the physical processor is not idle, then the dispatch mechanism waits a predetermined amount of time to determine if another physical processor has become idle (step 622). If at step 622 another physical processor has become idle, then the operation returns to step 620. If at step 622, another physical processor has not become idle, then the dispatch mechanism determines if there is any idle physical processor (step 624).

If at step 624 there is an idle physical processor, then the ready-to-run virtual processor is dispatched to the physical processor (step 608). If at step 624 no physical processor is idle, then the dispatch mechanism places the ready-to-run virtual processor on the dispatch queue (step 626). From steps 608 or 626, the dispatch mechanism determines if another virtual processor is ready to run (step 628). If at step 628 another virtual processor is ready to run, then the operation returns to step 604. If at step 628 another virtual processor is not ready to run, then the operation terminates.

Returning to step 604, if an affinity map for the virtual processor does not exist or existed affinity has expired, then the dispatch mechanism determines whether a physical processor in a home multi-chip module is idle (step 630). A home multi-chip module in a processor node is determined based on which multi-chip module has the most cache and memory allocated. If at step 630 a physical processor in the home multi-chip module is idle, then the virtual processor is dispatched to the idle physical processor (step 632). If at step 630 a physical processor is not idle, then the dispatch mechanism determines if there is any idle physical processor (step 634).

If at step 634 there is an idle physical processor, then the virtual processor is dispatched to the physical processor (step 632). If at step 634 no physical processor is idle, then the dispatch mechanism places the virtual processor on the dispatch queue (step 636). From steps 632 or 636, the dispatch mechanism determines if another virtual processor is ready to run (step 638). If at step 638 another virtual processor is ready to run, then the operation returns to step 604. If at step 638 another virtual processor is not ready to run, then the operation terminates.

Thus, the illustrative embodiments provide for dispatching virtual processors. Partition management firmware determines if a physical processor in a set of physical processors is idle forming a first idle physical processor. The partition management firmware determines if an affinity map for the first idle physical processor exists in response to an existence of the first idle physical processor. The affinity map provides a first mapping of the first idle physical processor to a set of virtual processors that ran last on the first idle physical processor over a number of events. The affinity map provides a second mapping of a set of partition identifiers to the set of virtual processors that ran last on the first idle physical processor over the number of events.

The partition management firmware determines whether a virtual processor in the set of virtual processors last mapped to the physical processor is ready to run using the affinity map for the first idle physical processor and a dispatch algorithm in response to an existence of the affinity map for the first idle physical processor. The partition management firmware dispatches the ready-to-run virtual processor to the first idle physical processor in response to identifying a ready-to-run virtual processor whose affinity map indicates that the first idle physical processor is mapped to this virtual processor in its preceding dispatch. Thus, memory affinity is maintained between physical and virtual processors when the memory affinity is not expired.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dispatching virtual processors, the computer implemented method comprising:
   determining if a physical processor in a set of physical processors configured to be shared among a set of two or more partitions is idle forming a first idle physical processor, wherein each partition of the set of two or more partitions is configured with a partition identifier and a plurality of virtual processors for dispatching on the shared set of physical processors;
   responsive to an existence of the first idle physical processor, determining if an affinity map for the first idle physical processor exists, wherein the affinity map provides a first mapping of the first idle physical processor to a set of virtual processors that ran last on the first idle physical processor over a number of events, a second mapping of a set of partition identifiers of the set of virtual processors that ran last on the first idle physical processor over the number of events, and a third mapping of the set of virtual processors last dispatched on the first idle physical processor, over the number of events, to the first idle physical processor;

responsive to an existence of the affinity map for the first idle physical processor, determining whether a virtual processor in the set of virtual processors last mapped to the first idle physical processor is ready to run using the affinity map for the first idle physical processor and a dispatch algorithm; and responsive to identifying a ready-to-run virtual processor whose affinity map indicates that the first idle physical processor is mapped to the ready-to-run virtual processor in its preceding dispatch, dispatching the ready-to-run virtual processor to the first idle physical processor, wherein memory affinity is maintained between physical and virtual processors and wherein the memory affinity is not expired.

2. The computer implemented method of claim 1, further comprising:

determining if the memory affinity is not expired, wherein determining if the memory affinity is not expired comprises:

determining if the first idle physical processor was last dispatched on the ready-to-run virtual processor;

determining if the ready-to-run virtual processor was last dispatched on the first idle physical processor;

determining if a cache of the first idle physical processor retains valid data for the ready-to-run virtual processor and a partition where the ready-to-run virtual processor last ran, wherein repopulating the cache is avoided.

3. The computer implemented method of claim 1, further comprising:

responsive to an absence of the ready-to-run virtual processor that was dispatched to the first idle physical processor in the preceding dispatch, placing the first idle physical processor on a queue for a predetermined amount of time;

receiving an indication that another physical processor in the set of physical processors configured to be shared among the set of two or more partitions became idle within the predetermined amount of time forming a second idle physical processor;

determining if the affinity map for the second idle physical processor that just became idle within the predetermined amount of time exists;

responsive to an existence of the affinity map for the second idle physical processor, analyzing the dispatch queue using the affinity map for the second idle physical processor and the dispatch algorithm to identify the ready-to-run virtual processor in the set of virtual processors that has memory affinity with the second idle physical processor; and responsive to identifying the ready-to-run virtual processor whose affinity map indicates that the second idle physical processor was dispatched on the ready-to-run virtual processor in the preceding dispatch, dispatching the identified ready-to-run virtual processor to the second idle physical processor.

4. The computer implemented method of claim 3, wherein analyzing the dispatch queue to identify the ready-to-run virtual processor in the set of virtual processors that has memory affinity with the second idle physical processor comprises:

determining if one of a set of ready-to-run virtual processors in the set of virtual processors was previously dispatched to the second idle physical processor in a preceding dispatch;

responsive to an absence of any of the set of ready-to-run virtual processors being previously dispatched to the second idle physical processor, determining if one of the set of ready-to-run virtual processors in the set of virtual processors ran on a partition where the second idle physical processor ran in the preceding dispatch;

responsive to an absence of any of the set of ready-to-run virtual processors running on the partition where the second idle physical processor ran in the preceding dispatch, determining if one of the set of ready-to-run virtual processors in the set of virtual processors ran on a processor core in a processor unit in the preceding dispatch, wherein the second idle physical processor is in the processor unit; and responsive to an absence of any of the set of ready-to-run virtual processors running on the processor core in the processor unit, determining if one of the set of ready-to-run virtual processors in the set of virtual processors ran on a multi-chip module in the preceding dispatch, wherein the second idle physical processor is in the multi-chip module.

5. The computer implemented method of claim 4, further comprising:

repeating any of the determining steps if another physical processor in the set of physical processors configured to be shared among the set of two or more partitions becomes idle.

6. The computer implemented method of claim 4, further comprising:

responsive to an absence of any of the set of ready-to-run virtual processors running on the multi-chip module, dispatching a first ready-to-run virtual processor in the dispatch queue.

7. The computer implemented method of claim 4, responsive to the absence of the affinity map or when affinity has expired for the second idle physical processor, dispatching a first ready-to-run virtual processor in the dispatch queue.

8. The computer implemented method of claim 1, wherein determining whether the physical processor within the set of physical processors configured to be shared among the set of two or more partitions is idle comprises:

determining if the physical processor where the virtual processor last ran is idle;

responsive to the physical processor where the virtual processor last ran being busy, determining if one of the set of physical processors in a same processing unit where the virtual processor last ran is idle;

responsive to the set of physical processors in the same processing unit being busy, determining if one of the set of physical processors in a same multi-chip module where the virtual processor last ran is idle; and responsive to the set of physical processors in the same multi-chip module being busy, determining if one of the set of physical processors in a home multi-chip module where the virtual processor last ran is idle.

9. The computer implemented method of claim 8, further comprising:

waiting the predetermined amount of time; and repeating any of the determining steps if another physical processor within the set of physical processors configured to be shared among the set of two or more partitions becomes idle.

10. The computer implemented method of claim 8, further comprising:
responsive to the set of physical processors in the home multi-chip module being busy, determining if at least one physical processor in the set of physical processors configured to be shared among the set of two or more partitions is idle.

11. The computer implemented method of claim 10, further comprising:
responsive to an absence of an idle physical processor in the set of physical processors configured to be shared among the set of two or more partitions, placing the virtual processor on a dispatch queue.

12. The computer implemented method of claim 1, further comprising:
responsive to the absence of the affinity map for the ready-to-run virtual processor, determining if at least one of the set of physical processors in a home multi-chip module is idle.

13. The computer implemented method of claim 12, further comprising:
responsive to the set of physical processors in the home multi-chip module being busy, determining if at least one physical processor in the set of physical processors configured to be shared among the set of two or more partitions is idle.

14. The computer implemented method of claim 11, further comprising:
responsive to an absence of the first idle physical processor in the set of physical processors configured to be shared among the set of two or more partitions, placing the virtual processor on a dispatch queue.

15. A data processing system comprising:
a bus system;
a communications system connected to the bus system;
a memory connected to the bus system, wherein the memory includes a set of instructions; and
a processing unit connected to the bus system, wherein the processing unit executes the set of instructions:
to determine if a physical processor in a set of physical processors configured to be shared among a set of two or more partitions is idle forming a first idle physical processor, wherein each partition of the set of two or more partitions is configured with a partition identifier and a plurality of virtual processors for dispatching on the shared set of physical processors;
to determine if an affinity map for the first idle physical processor exists in response to an existence of the first idle physical processor, wherein the affinity map provides a first mapping of the first idle physical processor to a set of virtual processors that ran last on the first idle physical processor over a number of events, a second mapping of a set of partition identifiers of the set of virtual processors that ran last on the first idle physical processor over the number of events, and a third mapping of the set of virtual processors last dispatched on the first idle physical processor, over the number of events, to the first idle physical processor;
to determine whether a virtual processor in the set of virtual processors last mapped to the first idle physical processor is ready to run using the affinity map for the first idle physical processor and a dispatch algorithm in response to an existence of the affinity map for the first idle physical processor; and
to dispatch a ready-to-run virtual processor to the first idle physical processor in response to identifying that the first idle physical processor is mapped to the ready-to-run virtual processor in its preceding dispatch as indicated by the ready-to-run virtual processor's affinity map, wherein memory affinity is maintained between physical and virtual processors and wherein the memory affinity is not expired.

16. The data processing system of claim 15, wherein the processing unit executes the set of instructions to determine if the memory affinity is not expired, wherein determining if the memory affinity is not expired comprises:
the processing unit executing the set of instructions to determine if the first idle physical processor was last dispatched on the ready-to-run virtual processor; determine if the ready-to-run virtual processor was last dispatched on the first idle physical processor; determine if a cache of the first idle physical processor retains valid data for the ready-to-run virtual processor and a partition where the ready-to-run virtual processor last ran, wherein repopulating the cache is avoided.

17. The data processing system of claim 15, wherein the processing unit executes the set of instructions to place the first idle physical processor on a queue for a predetermined amount of time in responsive to an absence of the ready-to-run virtual processor that was dispatched to the first idle physical processor in the preceding dispatch; receive an indication that another physical processor in the set of physical processors configured to be shared among a set of two or more partitions became idle within the predetermined amount of time forming a second idle physical processor; determine if the affinity map for the second idle physical processor that just became idle within the predetermined amount of time exists; analyze the dispatch queue using the affinity map for the second idle physical processor and the dispatch algorithm to identify the ready-to-run virtual processor in the set of virtual processors that has memory affinity with the second idle physical processor in response to an existence of the affinity map for the second idle physical processor; and dispatch the identified ready-to-run virtual processor to the second idle physical processor in response to identifying the ready-to-run virtual processor whose affinity map indicates that the second idle physical processor was dispatched on the ready-to-run virtual processor in the preceding dispatch.

18. A computer program product comprising computer-readable program instructions stored on a non-transitory computer readable medium when executed by a CPU to:
dispatch virtual processors;
determine if a physical processor in a set of physical processors configured to be shared among a set of two or more partitions is idle forming a first idle physical processor, wherein each partition of the set of two or more partitions is configured with a partition identifier and a plurality of virtual processors for dispatching on the shared set of physical processors;
determine if an affinity map for the first idle physical processor exists in response to an existence of the first idle physical processor, wherein the affinity map provides a first mapping of the first idle physical processor to a set of virtual processors that ran last on the first idle physical processor over a number of events, a second mapping of a set of partition identifiers of the set of virtual processors that ran last on the first idle physical processor over the number of events, and a third mapping of the set of virtual processors last dispatched on the first idle physical processor, over the number of events, to the first idle physical processor;

determine whether a virtual processor in the set of virtual processors last mapped to the first idle physical processor is ready to run using the affinity map for the first idle physical processor and a dispatch algorithm in response to an existence of the affinity map for the first idle physical processor; and determine a ready-to-run virtual processor to dispatch on the first idle physical processor in response to identifying that the first idle physical processor is mapped to the ready-to-run virtual processor in its preceding dispatch as indicated by the ready-to-run virtual processor's affinity map, wherein memory affinity is maintained between physical and virtual processors and wherein the memory affinity is not expired.

19. The computer program product of claim 18, further comprising computer readable instructions to:

determine if the memory affinity is not expired, wherein the computer usable program code for determining if the memory affinity is not expired includes:

determine if the first idle physical processor was last dispatched on the ready-to-run virtual processor;

determine if the ready-to-run virtual processor was last dispatched on the first idle physical processor;

determine if a cache of the first idle physical processor retains valid data for the ready-to-run virtual processor and a partition where the ready-to-run virtual processor last ran, wherein repopulating the cache is avoided.

20. The computer program product of claim 18, further including:

place the first idle physical processor on a queue for a predetermined amount of time in response to an absence of the ready-to-run virtual processor that was dispatched to the first idle physical processor in the preceding dispatch;

receive an indication that another physical processor in the set of physical processors configured to be shared among a set of two or more partitions became idle within the predetermined amount of time forming a second idle physical processor;

determine if the affinity map for the second idle physical processor that just became idle within the predetermined amount of time exists;

analyze the dispatch queue using the affinity map for the second idle physical processor and the dispatch algorithm to identify the ready-to-run virtual processor in the set of virtual processors that has memory affinity with the second idle physical processor in response to an existence of the affinity map for the second idle physical processor; and dispatch the identified ready-to-run virtual processor to the second idle physical processor in response to identifying the ready-to-run virtual processor whose affinity map indicates that the second idle physical processor was dispatched on the ready-to-run virtual processor in the preceding dispatch.

* * * * *